United States Patent [19]

Williams, III

[11] Patent Number: 4,969,390
[45] Date of Patent: Nov. 13, 1990

[54] ROD LOCKING DEVICE

[75] Inventor: Bolie C. Williams, III, Houston, Tex.

[73] Assignee: Cooper Industries, Inc., Houston, Tex.

[21] Appl. No.: 358,877

[22] Filed: May 30, 1989

[51] Int. Cl.[5] .............................................. F15B 15/26
[52] U.S. Cl. ........................................... 92/28; 92/27; 92/19; 92/15; 92/165 PR; 251/1.1; 251/1.2; 251/1.3
[58] Field of Search ................ 92/15, 18, 19, 20, 21 R, 92/22, 23, 24, 27, 28, 165 PR, 61, 65; 251/1.1, 1.2, 1.3

[56] References Cited

U.S. PATENT DOCUMENTS

| | | | |
|---|---|---|---|
| 2,821,172 | 1/1958 | Randall | 92/19 |
| 3,208,357 | 9/1965 | Allen . | |
| 3,242,826 | 3/1966 | Smith . | |
| 3,353,455 | 11/1967 | Berry . | |
| 3,470,793 | 10/1969 | Hanchen . | |
| 3,941,141 | 3/1976 | Robert . | |
| 4,052,995 | 10/1977 | Ellison . | |
| 4,076,208 | 2/1978 | Olson . | |
| 4,290,577 | 9/1981 | Olson . | |
| 4,293,115 | 10/1981 | Parks, Jr. et al. | 251/1.3 |
| 4,305,565 | 12/1981 | Abbe | 251/1.3 |
| 4,372,527 | 2/1983 | Rosenhauch et al. | 251/1.3 |
| 4,601,232 | 7/1986 | Troxell . | |
| 4,699,042 | 10/1987 | Stoll | 92/19 |
| 4,840,346 | 6/1989 | Adnyana | 251/1.1 |

FOREIGN PATENT DOCUMENTS

| | | | |
|---|---|---|---|
| 0266017 | 5/1988 | European Pat. Off. | 251/1.1 |
| 90772 | 3/1920 | Switzerland | 92/19 |

Primary Examiner—John T. Kwon
Assistant Examiner—Thomas Denion

[57] ABSTRACT

A new and improved ram locking apparatus for blowout preventer rams which allows the rams to be locked in the closed position and compensates for wear on the sealing elements of the rams. The device consists of a tubular cross containing a rod extension with a tapered end attached to the ram, a hydraulically reciprocal piston with a wedging surface to coact with the tapered end of the rod extensions and hydraulic fluid ports. The tapered end of the rod and the wedge surface of the piston have serrated surfaces to increase friction between the wedging surfaces and provide a self-locking engagement and thereby provide a small compact apparatus.

8 Claims, 7 Drawing Sheets

ROD LOCKING DEVICE

BACKGROUND

This invention concerns an improved rod locking device for locking reciprocating piston type fluid actuators in a preferred position. Actuators of this type are particularly suited for positioning the rams of ram-type oilfield blowout preventers. It is advantageous and desirable to mechanically lock the rods of these actuators thus ensuring that the rams of these blowout preventers will be maintained in their preferred position should hydraulic pressure be lost.

Prior rod locking devices of oilfield ram-type blowout preventers appear to reside in four types of devices. The first of these is typified by U.S. Pat. No. 3,353,455 which discloses the use of slip-like structures to grasp and lock the piston rod in place. Hydraulic means are provided for releasing these slip-like structures at the desired time. A similar structure is found in U.S. Pat. No. 3,470,793 wherein the slip-like structure is retained in a groove on the piston rod and the slips wedge a conically shaped friction liner outwardly against the piston housing to lock the piston rod. Another example of this type of device is disclosed in U.S. Pat. No. 3,941,141 wherein the slip-like structures are provided with friction engaging surfaces in the form of sharp teeth used to grasp a corresponding specially serrated surface on the piston rod of the ram-type blowout preventer.

The second type of rod locking device is disclosed in U.S. Pat. No. 3,242,826 in which a plurality of arcuate segments engage a mating groove in the wall of the piston housing to lock the piston rod. This structure is limited in that the locking of the rod can occur only at a limited number of discrete point in the rod's travel.

A third type of rod locking devices utilizes a pair of frictionally engaging discs which selectively lock and unlock an overhauling nut by a combination of mechanical and hydraulic means. This overhauling nut threadingly engages the piston rod of the ram-type blowout preventer and allows the rod to be locked in a desired position. Typical examples of these devices can be found in U.S. Pat. Nos. 4,052,995 and 4,076,208 and 4,290,577.

U.S. Pat. Nos. 3,208,357 and 4,601,232 disclose the fourth type of structure which locks the rod in position by wedging means acting on the end of the tail rod with a hydraulic release means. These wedging type of lock devices are the simplest type of structure except that they require some additional locking structure or the wedge must be substantially elongated with a very shallow angle to provide a locking taper.

SUMMARY

The present invention provides an improved device for locking the rod of a hydraulic cylinder or the tail rod of a ram-type oilfield blowout preventer.

The improved rod locking device includes a hydraulic cylinder housing in which is mounted a reciprocal member which has a wedging means for engaging the end of the tail rod of the blowout preventer. The housing is mounted to the blowout preventer with the rod extending therefrom and into the housing with suitable sealing between the housing and the tail rod. The reciprocal member seals against the inside of the housing and is responsive to fluid pressure, allowing the wedging means to lock and unlock the tail rod and piston of the blowout preventer in their innermost position and to unlock them for movement. The main feature of this invention involves the serrations on the engaging surface of the wedging means the end of the tail rod. The configuration of these surfaces coact to provide a self-locking engagement between the wedging means and the end of the tail rod which eliminates complicated locking devices and also does not require the substantial elongation of the locking device to achieve the shallow taper usually necessary for the self-locking engagement.

An object of the present invention is to provide a rod locking device which will lock the rod of a hydraulic cylinder in a desired position with a simplified mechanism.

Another object is to provide an improved ram lock for a ramtype blowout preventer which is fluid actuated and avoids the complicated mechanisms of prior ram locking devices.

A further object of the present invention is to provide a wedging type of ram lock which has a self-locking engagement with the tail rod it engages and which will compensate for the wear of the seal elements of the ram.

A still further object is to provide a ram lock which is compact and requires less hydraulic force to release than prior ram locking devices.

BRIEF DESCRIPTION OF THE DRAWINGS

These and other objects and advantages of the present invention are set forth below and further made clear by reference to the drawings, where.

DESCRIPTION OF THE PREFERRED EMBODIMENTS

Figure 1:
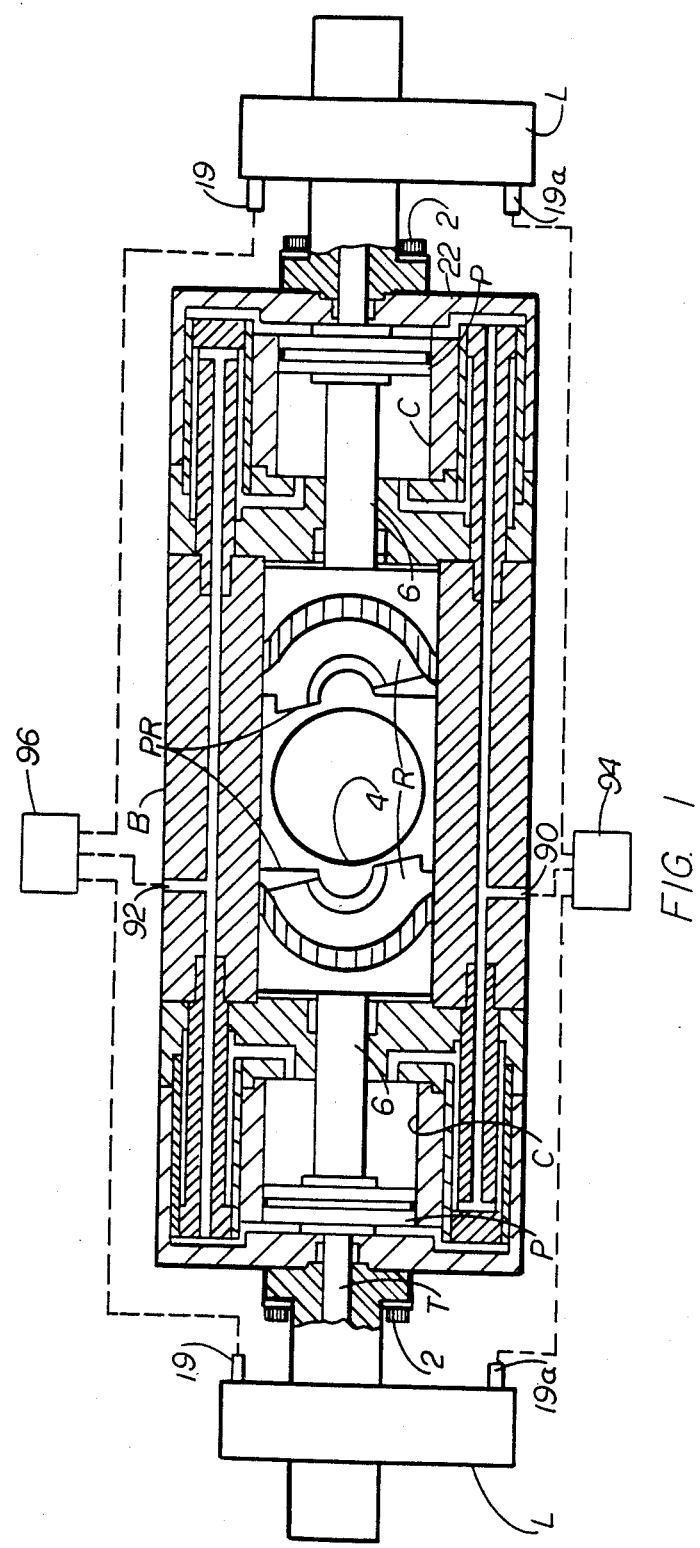
FIG. 1 is a plan view, partly in section, of a ramtype blowout preventer with an improved locking device of the present invention installed around the portion of each tail rod extending from the blowout preventer.

With reference to FIG. 1, ram-type blowout preventer B is shown with the improved rod locking devices L of the present invention installed thereon. Rod locking devices L are mounted to blowout preventer B by suitable means such as cap screws 2 with tail rods T extending therefrom into devices L and with suitable sealing around tail rods T. Each of tail rods T is suitably connected to their piston P which in turn is connected by connecting rod 6 to the rearward portion of ram R. Pistons P are hydraulically reciprocal in cylinder C, thereby moving rams R between their open (shown)

and closed (sealing across the central bore 4) positions. Opposing rams R have sealing elements PR attached to their end face, acting to seal bore 4 when in the extended position. Rod locking device L is fluid actuated through hydraulic ports 19 and 19a, as will be described below, between its locked and unlocked positions, engaging and disengaging from the end of the tail rod T.

Figure 2:
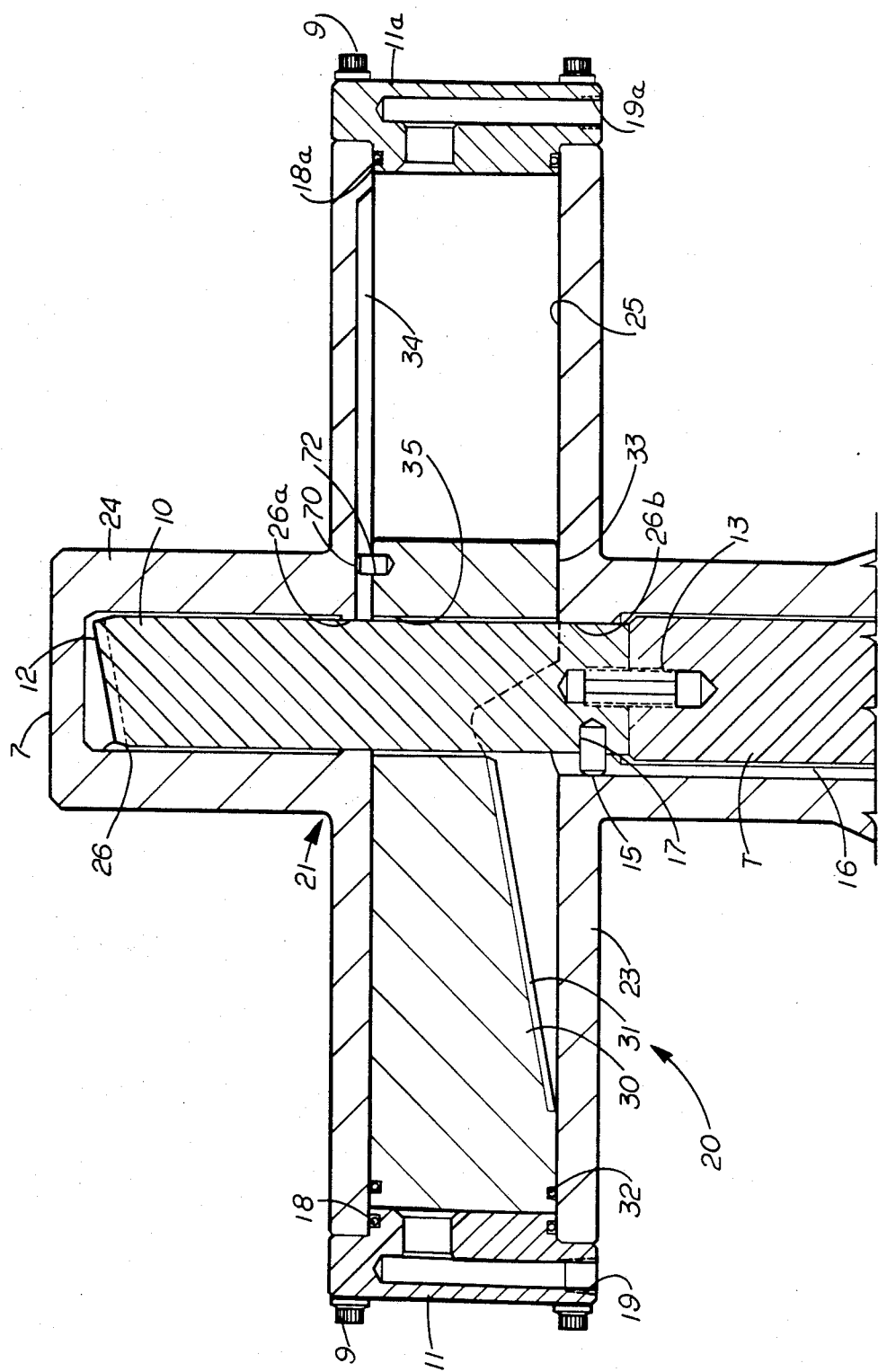
FIG. 2 is a sectional view showing the rod locking device of the present invention in its unlocked position.

The embodiment of improved ram lock L shown in FIG. 2 is denoted generally by numeral 20. Ram lock 20 includes housing 21 sealingly attached to ram-type blowout preventer 22 by suitable means such as cap screws 2, shown in FIG. 1. The primary axis of housing 21 is shown perpendicular to the axis of tail rod T and tail rod extension 10, although the present invention contemplates an embodiment in which the primary axis of housing 21 would be at an oblique angle with respect to the axis of tail rod T and extension 10. This would allow end surface 12 of tail rod extension 10 to be perpendicular to the axis of extension 10. End surface 12 is machined to coact with wedging surface 31 of piston 30 in a manner to be discussed below.

Tail rod extension 10 is secured in abutting relationship to tail rod T by stud 13. Proper orientation of end surface 12 with respect to wedging surface 31 is achieved by using orientation pin 15 closely fitted in hole 17 of tail rod extension 10. Orientation pin 15 slides in slot 16 to ensure that surfaces 12 and 31 remain parallel.

Ram lock housing 21 is composed of intersecting tubular members 23 and 24 having bores 25 and 26, respectively. Bore 26 terminates in closed end 7 which is integrally formed with tubular member 24. Bore 26 slidingly receives tail rod extension 10 with closely fitting portions 26a and 26b acting to guide and support extension 10 during operation. Wedging piston 30 is sealingly and reciprocally received within transverse bore 25. Piston 30 is sealed against bore 25 by sealing means, such as 0 ring 32, thus allowing wedging piston 30 to be hydraulically reciprocated between its locked (FIG. 3) and unlocked (FIG. 2) positions. Transverse tubular member 23 is sealingly closed at each end by end caps 11 and 11a. End caps 11 and 11a are provided with sealing means, such as O ring 18 and 18a, respectively, which seal against the interior bore 25 of tubular member 23. End caps 11 and 11a are suitable secured to tubular member 23 by securing means such as cap screws 9.

Reciprocation of wedging piston 30 is accomplished by selective introduction of hydraulic fluid into threaded ports 19 and 19a which communicate with the lock and unlock sides of piston 30, respectively. Hydraulic fluid introduced into port 19 moves wedging piston 30 to its locked position (FIG. 3) and hydraulic fluid introduced into port 19a moves wedging piston 30 to its unlocked position (FIG. 2). Piston 30 has a transverse bore 35 which closely receives tail rod extension 10 and aids in maintaining alignment. Slot 34 in bore 25 extends from a point adjacent end cap 11a to the intersection of bores 25 and 26. An alignment pin 70, similar to pin 15, is closely fitted into the outer surface 33 of piston 30 parallel to the axis of transverse bore 35 and sliding in slot 34. This arrangement prevents rotation of piston 30 and ensures proper interaction of end surface 12 and wedging surface 31.

Figure 3:
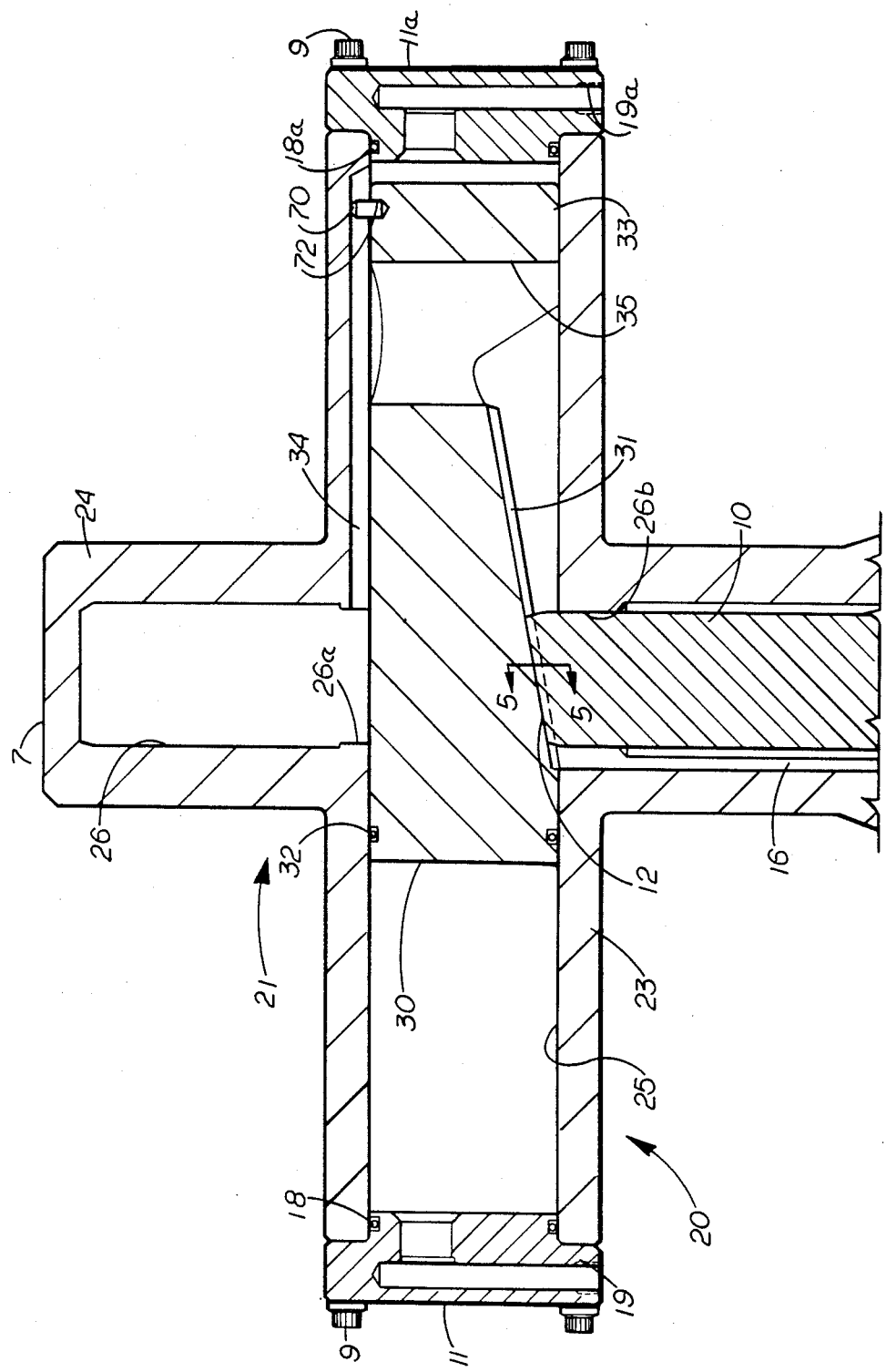
FIG. 3 is a similar sectional view of the improved ram locking device in its locked position.

FIG. 3 shows the wedging piston 30 in its fully locked position. Wedging surface 31 and end surface 12 are meshed together in a manner to be more fully described below and piston P, tail rod T and ram R are restrained against movement. The sealing element PR of ram R wears with each use and thus requires the ram of the blowout preventer to be gradually moved forward to effect a proper seal after repeated use. This slight change in the position of ram R, and consequently tail rod T and tail rod extension 10, requires that wedging surface 31 have sufficient length to compensate for the ram sealing element wear, as evidenced by the relatively greater length of wedging surface 31 as compared to end surface 12. When surfaces 12 and 31 are in the position shown in FIG. 3, the ram seal element PR is very worn and in need of replacement, while a new ram seal element would cause end surface 12 to engage wedging surface 31 adjacent transverse bore 35. The stroke of piston 30 is sufficient to allow a full range of engagement between surfaces 12 and 30.

Figure 4:
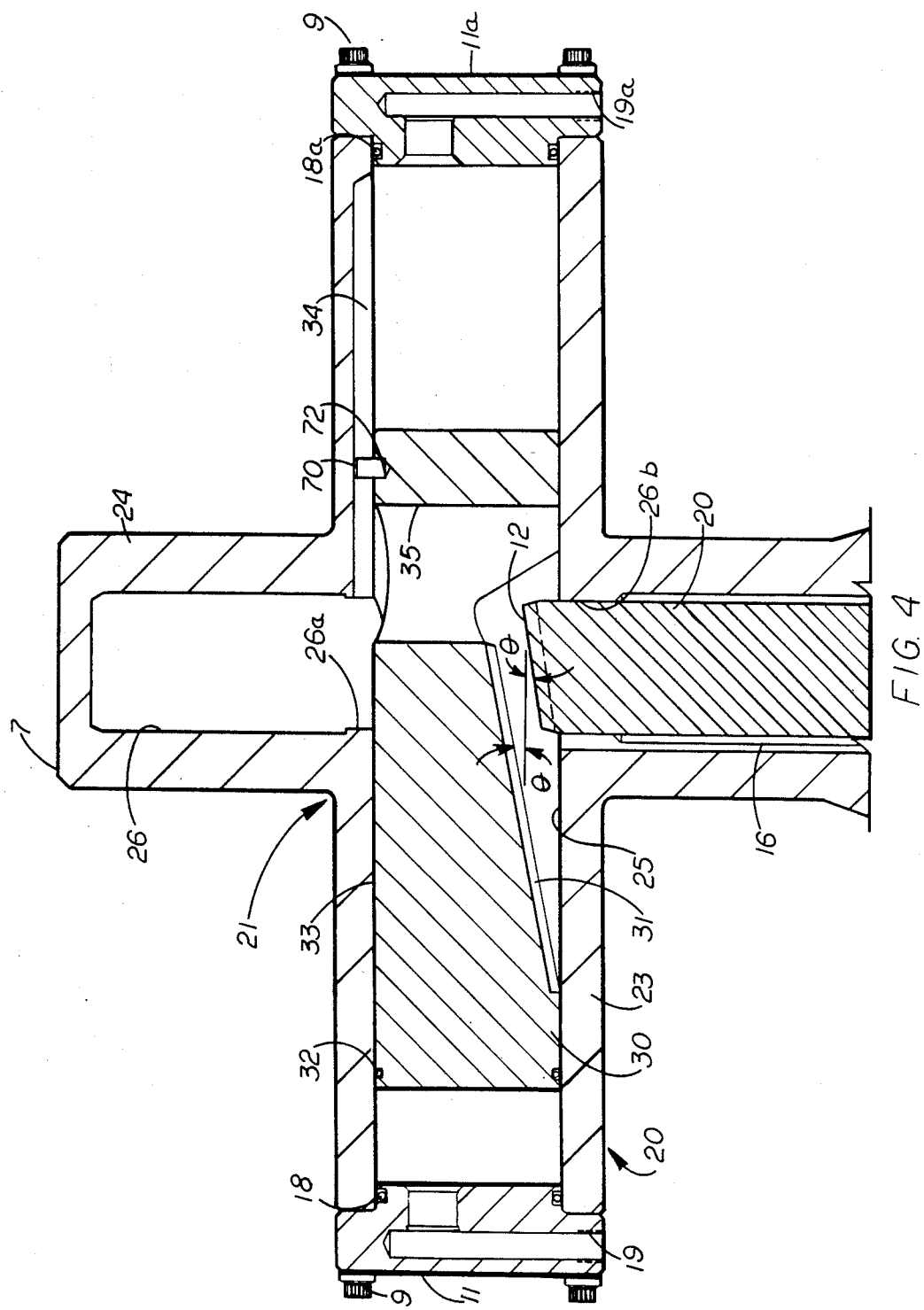
FIG. 4 is a sectional view of the present invention showing an intermediate position of the ram lock.

FIG. 4 shows the improved ram lock device in a position intermediate its locked and unlocked positions. Tail rod extension 10 and ram R have been stroked to the closed (sealing) position and wedging piston 30 is being shifted to lock the tail rod extension 10. Proper alignment and engagement between wedging surface 31 and end surface 12 is ensured by the coaction of pin 15 with groove 16 and similar pin 70 coacting with groove 34 as described above. Wedging piston 30 is shifted by pressurized hydraulic fluid being introduced into port 19, while fluid on the opposite side of sealing means 32 is exhausted through port 19a.

A typical cycle of operation commences with the improved ram locking device in the position shown in FIG. 2. In this position, ram R and piston P are retracted as shown in FIG. 1, with tail rod extension 10 extending through bore 35 of wedging piston 30. Ram R and piston P are extended by pressurized hydraulic fluid being introduced into closing port 92 through sequence valve 96 of blowout preventer B, thereby shifting tail rod extension 10 to the position shown in FIG. 3. Wedging piston 30 is subsequently shifted to the position shown in FIG. 3 by pressurized hydraulic fluid being introduced into port 19 through sequence valve 96.

When it is desired to release the improved ram locking device, the following steps occur. The wedging piston 30 begins shifting, FIG. 4, to the unlock position, FIG. 2, by introducing pressurized hydraulic fluid into port 19a through sequence valve 94. Upon wedging piston 30 reaching the unlocked position, FIG. 2, tail rod extension 10 is extended through bore 35 of wedging piston 30 by introducing pressurized hydraulic fluid into port 90 through sequence valve 94. Reduced diameters 26a and 26b aid in guiding tail rod extension 10.

Figure 5:
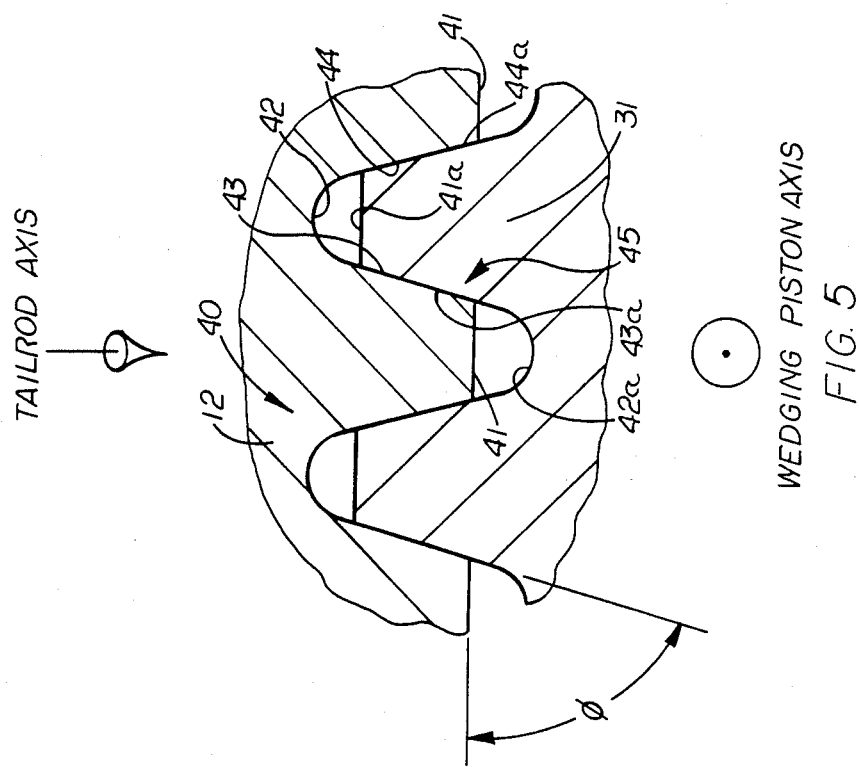
FIG. 5, taken along lines 5—5 of FIG. 3, shows a detail sectional view of the relationship of the rod locking device and the tail rod of the ram-type blowout preventer.

The details of the interaction between end surface 12 and wedge surface 31 are best seen in FIG. 5. Surfaces 12 and 31 are inclined at wedge angle $\phi$, as best seen in FIG. 4. Surfaces 12 and 31 are serrated, with mating serrations 40 and 45, respectively, being of a thread-like configuration. Serrations 40 have flattened crests 41 with corresponding rounded roots 42 interconnecting flanks 43 and 44. Mating serrations 45 have flattened crests 41a with corresponding rounded roots 42a, interconnected by flanks 43a and 44a. Flank angle $\phi$ determines the configuration of mating serrations 40 and 45 and is related to wedge angle $\Theta$ by mathematical relations developed below. The tail rod axis and wedging piston axis are perpendicular, coacting as shown in FIG. 5.

Figure 6:
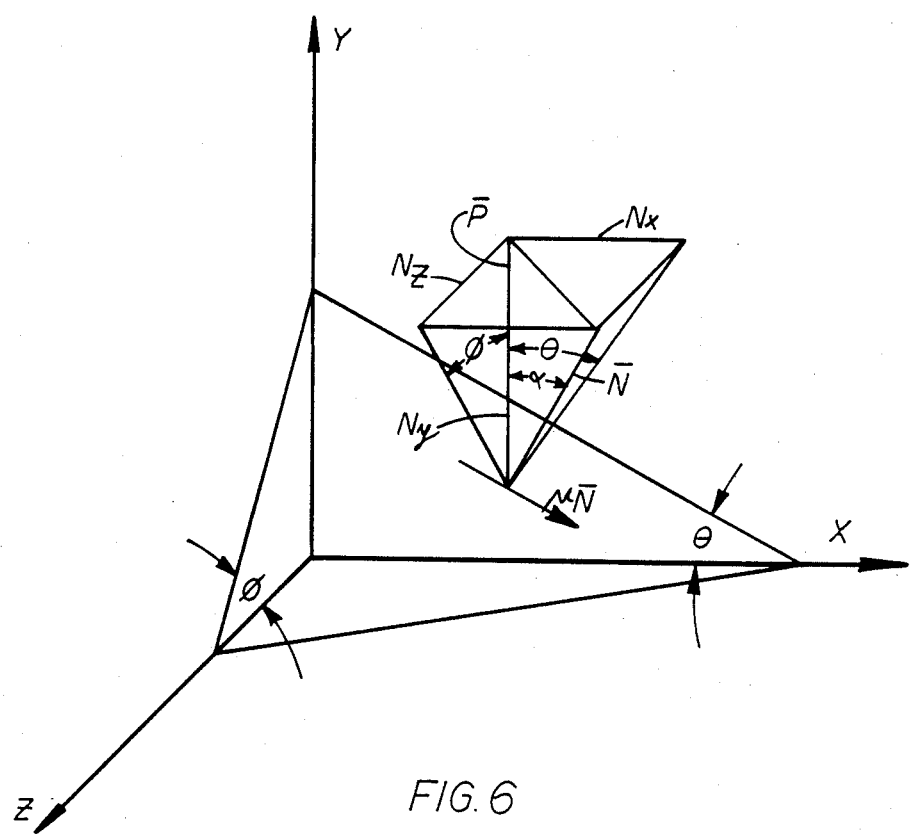
FIG. 6 is a diagram showing the interrelationship of the serrated surfaces and the forces generated.

The interaction of serrated surfaces 12 and 31 and the forces associated therewith can be best understood by use of the diagram of FIG. 6. As drawn, the X axis represents the wedging piston axis (FIG. 5) and the Y axis represents the tail rod axis. The Z axis is mutually perpendicular to the X and Y axes. Piston force P is due to the wellhead pressure contained within the blowout preventer B acting on ram R, connecting rod 6, tail rod T, and tail rod extension 10. As this force P acts on tail rod extension 10, mating serration flanks 43, 43a and 44, 44a are pressed into contact with a resultant force N acting perpendicularly to the flank faces, 43, 43a and 44, 44a. The coefficient of friction between the opposing flank faces is represented by $\mu$, with $\mu\overline{N}$ representing the friction force tending to hold the wedging piston 30 "locked" from movement. With the wedging piston 30 constrained thusly, tail rod extension 10 cannot retract.

The interrelationship of the forces is shown in FIG. 6 by the force "prism". Resolution of forces P and N into the orthogonal set of axes gives the following relationship:

$$N = \frac{P}{\cos \alpha}$$

where $\alpha$ is determined by: $\tan^2\alpha = \tan^2\phi + \tan^2\Theta$. The design of the improved locking device is determined by interactive solution of the equations above.

It has been determined that using a locking device such as described above having an angle $\Theta$ in the range from 13° to 23° with 18° preferred and an angle phi in the range from 60° to 75° with 70° preferred provides the improved locking device of the present invention with all of its advantages as discussed herein. With these angles established it is possible to provide a wedging type of rod locking device which because of the coaction of the two angles $\Theta$ and $\phi$ will provide the engagement between the wedging means and the tail rod to be a self-locking engagement which will not be separated until positively moved by hydraulic pressure. This eliminates the need for a separate locking mechanism associated with the wedging means and also provide a very compact and short structure transverse to the axis of the rod.

Figure 7:
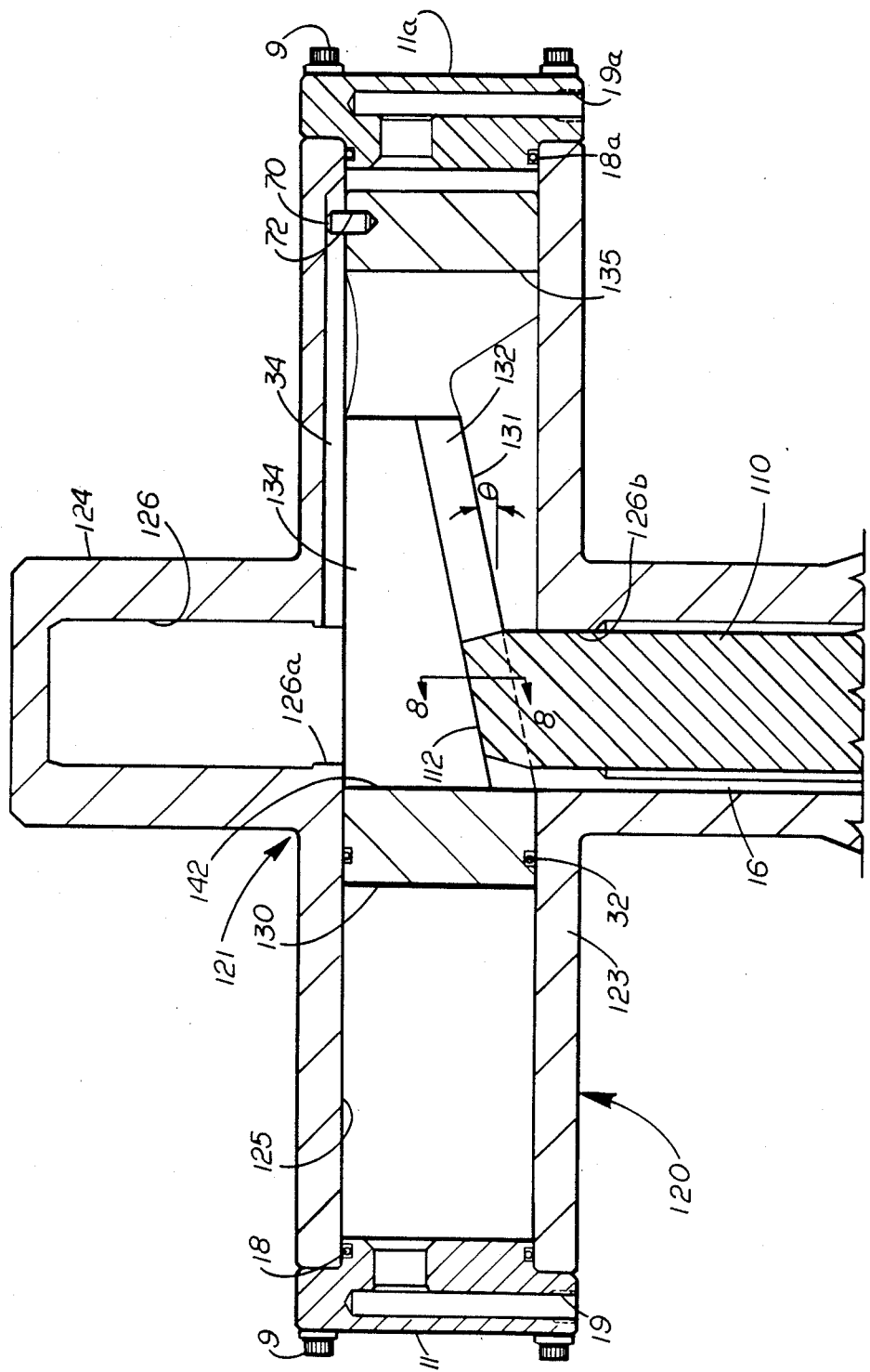
FIG. 7 is a sectional view of an alternate embodiment of the improved ram locking device in its locked position.

An alternate embodiment of the improved ram locking device is shown in FIG. 7. The ram lock 120 is similar to first embodiment 20 with the primary difference being the change in the engaging surfaces of wedging piston 130 and tail rod extension 110. Ram lock 120 includes housing 121 sealingly attached to ram-type blowout preventer 122 by suitable means as described above. Ram lock housing 121 is comprised of intersecting tubular members 123 and 124 with bores 125 and 126, respectively. Bore 126 slidingly receives tail rod extension 110 with closely fitting portions 126a and 126b guiding and supporting extension 110 during operation. Wedging piston 130 is sealingly and reciprocally received within transverse bore 125. Wedging piston 130 reciprocates in a manner similar to the first embodiment described above. Wedging piston 130 has a transverse bore 135 which closely receives tail rod extension 110 and aids in maintaining alignment. Intersecting transverse bore 135 is notched surface 131, more clearly seen in FIG. 8. Parallel planar surfaces 134 and 138, oblique to notched surface 131, extend from transverse bore 135 to edge surface 142 and are coplanar with the central axis of wedging piston 130. Edge surface 142 extends from the intersection of planar surfaces 134 and 138 and notched surface 131, diametrically, to the opposite side of wedging piston 130. Tail rod extension 110 has its end surface 112 beveled to coact with notched surface 131 of wedging piston 130.

Figure 8:
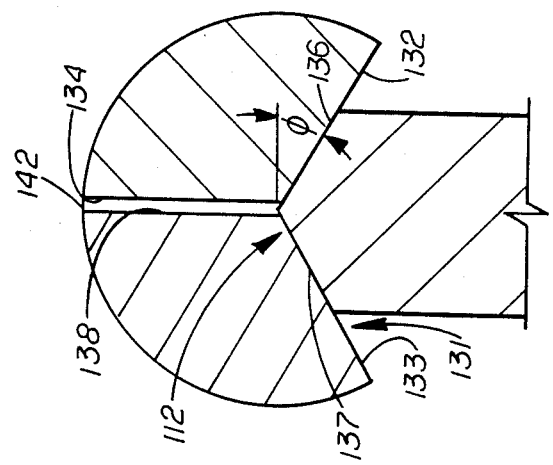
FIG. 8 is a sectional view taken along lines 8—8 of FIG. 7, showing the relationship of the rod locking device and the tail rod of the ram-type blowout preventer for the alternate embodiment.

The details of the interaction between surfaces 112 and 131 are best seen in FIG. 8, taken along lines 8—8 in FIG. 7. Notched surface 131 is composed of diverging equal angled surfaces 132 and 133 defined by angle $\phi$. Angled mating surfaces 136 and 137 comprise the end surface 112 of tail rod extension 110. End surface 112 and notched surface 131 are also tapered, as shown in FIG. 7, with the angle denoted by $\Theta$. With the angles $\Theta$ and $\phi$ so defined, the relationships developed above concerning P and N are still applicable. Thus, the design of this alternate embodiment can be optimized by iterative solution of the aforementioned equations.

In the embodiment of the invention described with respect to FIGS. 7 and 8, it is preferred that the angle $\Theta$ be in the range from 13° to 23° with 18° preferred and that the angle $\phi$ be in the range from 60° to 75° with 70° preferred. Such configuration provides the advantages of the present invention. As stated above with respect to the structure of the first described embodiment, the coaction of the angles $\Theta$ and $\phi$ is such that the engagement of the wedging means with the end of the tail rod is a self-locking engagement which is not accidentally release but is released on the application of a modest amount of hydraulic pressure. This provides the shortened structure which is desirable and eliminates the need for a locking mechanism in the improved rod locking device of the present invention.

What is claimed is:

1. A rod locking apparatus, comprising:
   a housing having a first and second intersecting tubular bores,
   a pressure responsive means within said first tubular bore with closure means sealingly attached to each end of said first tubular bore,
   a rod extension closely received within said second tubular bore with said rod extension having an outer end oblique to the rod extension's longitudinal axis and closure means sealing one end of said second tubular bore,
   an oblique surface on said pressure responsive means parallel to said outer end of said rod extension,
   a piston connected to said rod extension,
   a means for supplying fluid under pressure,
   a first guide means associated with said first tubular bore and said pressure responsive means,
   a second guide means associated with said second tubular bore and said rod extension,
   a control means for said fluid supply means to allow sequential operation of said pressure responsive means and said piston between first and second positions, and,
   the effective angle of engagement between said rod extension outer end and said pressure responsive means oblique surface being enhanced by having said surfaces serrated so that such engagement is self-locking.

2. A rod locking apparatus according to claim 1 wherein said pressure responsive means within said first tubular bore includes:
   a piston reciprocable between said first and said second positions with said first position allowing said rod extension to be closely received within said transverse bore and said second position allowing said oblique surface to tightly engage said outer end of said rod extension, and
   wherein said first guide means includes a pin affixed to the outer diameter of said piston engaging an axial groove within said first tubular bore to maintain a preferred orientation.

3. A rod locking apparatus according to claim 2 in which said second guide means includes:
a pin affixed to the outer diameter of said rod extension engaging an axial groove within second tubular bore to maintain a preferred orientation.

4. A ram locking apparatus for a blowout preventer with a through bore, at least one pair of rams, a piston connected to each ram, a connecting rod connected to the distal end of each piston, said apparatus comprising:
a housing having first and second intersecting tubular bores,
a pressure responsive means within said first tubular bore with closure means sealingly attached to each end of said first tubular bore,
a rod extension closely received within said second tubular bore with said rod extension having an outer end oblique to the rod extension's longitudinal axis and closure means sealing one end of said second tubular bore,
an oblique surface on said pressure responsive means parallel to said outer end of said rod extension,
a piston connected to said rod extension,
a means for supplying fluid under pressure,
a first guide means associated with said first tubular bore and said pressure responsive means,
a second guide means associated with said second tubular bore and said rod extension, and
a control means for said fluid supply means to allow sequential operation of said pressure responsive means and said piston between first and second positions, and,
the effective angle of engagement between said rod extension outer end and said pressure responsive means oblique surface being enhanced by having said surfaces serrated so that such engagement is self-locking.

5. A ram locking apparatus according to claim 4 wherein said pressure responsive means within said first tubular bore includes:
a piston reciprocable between said first and said second positions with said first position allowing said rod extension to be closely received within said transverse bore and said second position allowing said oblique surface to tightly engage said outer end of said rod extension, and
wherein said first guide means includes
a pin affixed to the outer diameter of said piston engaging an axial groove within said first tubular bore to maintain a preferred orientation.

6. A ram locking apparatus according to claim 5 in which said second guide means includes:
a pin affixed to the outer diameter of said rod extension engaging an axial groove within second tubular bore to maintain a preferred orientation.

7. A ram locking apparatus according to claim 1 or 4 in which said serrated surfaces comprise:
a pair of oblique surfaces on said rod extension with an included angle in the range 90° to 170°, and a pair of oblique surfaces on said pressure responsive means with an included angle complementary to said included angle on said rod extension.

8. A ram locking apparatus comprising
a rod having an end surface tapering at an oblique angle to its axis,
a housing having a first bore therethrough for receiving said rod and a second bore therethrough transversely intersecting said first bore,
a pressure responsive means positioned for movement within said second bore and having a tapered surface for engaging the end surface of said rod, and
means for supplying pressure to the opposite ends of said second bore to cause the movement of said pressure responsive rams into and out of engagement with said end surface of said rod,
said rod end surface and said tapered surface having mating tapers including tapered surfaces with serrations therein extending generally parallel to the axis of said pressure responsive means to that the tight engagement of said surfaces is a self-locking engagement.

* * * * *